(12) United States Patent
Visser et al.

(10) Patent No.: US 10,456,750 B2
(45) Date of Patent: Oct. 29, 2019

(54) MEMBRANE CARTRIDGE SYSTEM

(71) Applicant: Evonik Fibres GmbH, Schörfling am Attersee (AT)

(72) Inventors: Tymen Visser, Straß im Attergau (AT); Steven K. Pedersen, Burlington (CA)

(73) Assignee: Evonik Fibres GmbH, Schörfling am Attersee (AT)

( * ) Notice: Subject to any disclaimer, the term of this patent is extended or adjusted under 35 U.S.C. 154(b) by 286 days.

(21) Appl. No.: 14/898,093

(22) PCT Filed: May 20, 2014

(86) PCT No.: PCT/EP2014/060334
§ 371 (c)(1),
(2) Date: Dec. 11, 2015

(87) PCT Pub. No.: WO2014/198501
PCT Pub. Date: Dec. 18, 2014

(65) Prior Publication Data
US 2016/0151744 A1 Jun. 2, 2016

(30) Foreign Application Priority Data

Jun. 12, 2013 (EP) .................................... 13171681

(51) Int. Cl.
*B01D 53/22* (2006.01)
*B01D 63/04* (2006.01)
*B01D 63/02* (2006.01)

(52) U.S. Cl.
CPC .......... *B01D 63/04* (2013.01); *B01D 63/022* (2013.01); *B01D 2313/04* (2013.01); *B01D 2313/21* (2013.01); *B01D 2313/44* (2013.01)

(58) Field of Classification Search
CPC .......... B01D 2313/21; B01D 2313/04; B01D 63/04; B01D 63/022; B01D 2313/44; B01D 63/02
See application file for complete search history.

(56) References Cited

U.S. PATENT DOCUMENTS 2,343,906 A * 3/1944 Hothersall .............. B31B 50/00
118/423
2,700,390 A * 1/1955 Poston ................... A45B 13/00
135/19.5

(Continued)

FOREIGN PATENT DOCUMENTS

EP 1005896 6/2000
JP H11028341 2/1999

(Continued)

OTHER PUBLICATIONS

International Search Report and Written Opinion for Application No. PCT/EP2014/060334 dated Jun. 27, 2014 (11 pages).

(Continued)

*Primary Examiner* — Anthony R Shumate
(74) *Attorney, Agent, or Firm* — Michael Best & Friedrich LLP

(57) ABSTRACT

The present invention is related to a new membrane cartridge system comprising hollow fiber membranes, a special new end cap for the production of the new cartridge, membrane separation devices comprising the new membrane cartridges and a process for manufacture of the new cartridges.

14 Claims, 4 Drawing Sheets

(56) References Cited

U.S. PATENT DOCUMENTS

| | | | | |
|---|---|---|---|---|
| 3,339,341 | A * | 9/1967 | Murdock | B01D 63/02 |
| | | | | 95/53 |
| 4,248,817 | A * | 2/1981 | Frank | B29C 33/52 |
| | | | | 264/102 |
| 4,323,453 | A | 4/1982 | Zampini | |
| 4,480,683 | A | 11/1984 | Wollbeck et al. | |
| 4,911,846 | A * | 3/1990 | Akasu | B01D 63/02 |
| | | | | 210/321.8 |
| 4,917,798 | A * | 4/1990 | Liou | B01D 63/022 |
| | | | | 210/321.89 |
| 5,053,130 | A * | 10/1991 | Raff | B01D 63/02 |
| | | | | 210/321.79 |
| 5,304,312 | A * | 4/1994 | Forster | B01D 25/24 |
| | | | | 210/232 |
| 5,470,469 | A | 11/1995 | Eckman | |
| 8,449,659 | B2 * | 5/2013 | Taylor | B01D 19/0031 |
| | | | | 95/46 |
| 9,248,408 | B2 | 2/2016 | Kanougi et al. | |
| 9,314,744 | B2 * | 4/2016 | Kim | B01D 63/021 |
| 9,504,962 | B2 * | 11/2016 | Yamaoka | B01D 53/22 |
| 2003/0102264 | A1 | 6/2003 | Pope et al. | |
| 2003/0201266 | A1 * | 10/2003 | Steffan | B65D 59/06 |
| | | | | 220/258.2 |
| 2004/0076874 | A1 * | 4/2004 | Nickel | B01D 61/362 |
| | | | | 429/104 |
| 2005/0058889 | A1 * | 3/2005 | Goishihara | H01M 4/04 |
| | | | | 429/94 |
| 2005/0164547 | A1 * | 7/2005 | Sakaguchi | H01R 4/70 |
| | | | | 439/521 |
| 2007/0023290 | A1 * | 2/2007 | Hawkins | B01D 61/445 |
| | | | | 204/520 |
| 2008/0078717 | A1 * | 4/2008 | Shigesada | B01D 63/087 |
| | | | | 210/455 |
| 2008/0251954 | A1 * | 10/2008 | Casper | B01F 3/0412 |
| | | | | 261/122.1 |
| 2010/0065485 | A1 * | 3/2010 | Chen | B01D 61/18 |
| | | | | 210/220 |
| 2010/0072124 | A1 | 3/2010 | Morikawa | |
| 2011/0036764 | A1 | 2/2011 | Lin | |
| 2011/0127206 | A1 * | 6/2011 | Meyer-Blumenroth | B01D 63/043 |
| | | | | 210/232 |
| 2011/0139345 | A1 * | 6/2011 | White | A61M 1/34 |
| | | | | 156/145 |
| 2012/0031831 | A1 | 2/2012 | Kanougi et al. | |
| 2012/0080377 | A1 * | 4/2012 | Jensen | B01D 11/0446 |
| | | | | 210/643 |
| 2012/0123079 | A1 | 5/2012 | Ungerank | |
| 2012/0304856 | A1 | 12/2012 | Kanetsuki et al. | |
| 2014/0061111 | A1 * | 3/2014 | Pavel | B01D 65/00 |
| | | | | 210/232 |
| 2015/0174533 | A1 * | 6/2015 | Li | B01D 53/22 |
| | | | | 95/45 |
| 2016/0106296 | A1 * | 4/2016 | Cai | B01D 63/02 |
| | | | | 134/98.1 |
| 2016/0107125 | A1 * | 4/2016 | Kobayashi | B01D 63/04 |
| | | | | 210/232 |
| 2019/0003186 | A1 * | 1/2019 | Seo | E04F 11/032 |

FOREIGN PATENT DOCUMENTS

| | | |
|---|---|---|
| JP | 2000226792 | 8/2000 |
| JP | 2007167806 | 7/2007 |
| JP | 2013099703 | 5/2013 |
| WO | 2002004100 | 1/2002 |
| WO | 2011009919 | 1/2011 |
| WO | 2011022380 | 2/2011 |
| WO | 2010114010 | 10/2012 |
| WO | 2012166231 | 12/2012 |
| WO | 2012170956 | 12/2012 |

OTHER PUBLICATIONS

European Search Report for Application No. 13171681.3 dated Nov. 14, 2013 (7 pages).

* cited by examiner

MEMBRANE CARTRIDGE SYSTEM

CROSS-REFERENCE TO RELATED APPLICATIONS

This application is a U.S. national stage filing under 35 U.S.C. 371 of International Application No. PCT/EP2014/060334, filed May 20, 2014, which claims the benefit of priority to European Application No. 13171681.3, filed on Jun. 12, 2013, each of which are incorporated herein by reference in their entireties.

The present invention is related to a new membrane cartridge system comprising hollow fiber membranes, a special new end cap for the production of the new cartridges, membrane separation devices comprising the new membrane cartridges and a process for manufacturing the new cartridges.

For gas separation and liquid filtration with hollow fiber membranes two major techniques are known in the art. On the one hand there are membrane modules containing hollow fiber membranes. On the other hand there are systems using cartridge elements.

Modules can be used for various applications in gas separation, such as biogas upgrading, helium or $H_2$ recovery or upgrading, $N_2$-enrichment, gas drying, etc. Within many of these markets the maximum pressure is less than ca. 50 bars, thus bore feed modules can be used.

Membrane modules have a limited lifetime and are typically replaced several times over the lifetime of a membrane plant. In the case of a conventional membrane module, the entire module including membranes and the expensive housing has to be replaced. Due to its complexity and pressure requirements, a conventional module is relatively heavy, ca. 30 kg. Thus, the replacement costs for modules are very high. Examples for Membrane Modules can be found in US 20120304856, US 20100072124, US 20030102264 and WO 200204100.

To overcome this problem membrane cartridge systems have been developed. In cartridge systems, only the lower-cost cartridge is replaced while the expensive cartridge housing stays in the membrane plant. Membrane cartridge systems are used in gas separation and liquid filtration applications. Examples of cartridge systems can be found in US 20120304856 A1, EP 1005896 A1, JP 11028341 A, U.S. Pat. Nos. 4,480,683, 5,470,469 A, US 2011036764 A1, WO 0166231 A1, WO 2011022380 A1 and WO 2012170956 A1. As can be seen in these patents many different concepts for cartridges exist.

Typically a module or cartridge is made by attaching moulds to the ends of a metal or plastic tube filled with hollow fiber membranes and filling these moulds with a thermosetting resin (potting resin), preferably an epoxy resin. To improve resin distribution among the fibers in the tubes sheet and reduce wicking effects (i.e. resin wicking up the fiber due to capillary forces) typically the cartridge is centrifuged. After curing the resin the moulds are removed and the tube sheet is cut back to open the fibers and form the end face of the tube sheet.

In today's commercially used systems the cartridges are characterized by a non-stick between tube wall and potting (i.e. tube sheet) for reasons described below.

During operation of a bore feed module (or so-called "inside-out") pressure is directed onto the tube sheet which would push the tube sheet into the cartridge tube. To prevent the tube sheet from pushing in, it rests on the ledge (i.e. chamfered tube face) or a groove is made into the wall of the stainless steel tube. This means that the applied force concentrates on the ledge or within the groove edge. These edges require a radius (or have to be chamfered) to prevent epoxy cracking due to the excessive stress build up at these points during pressurization of the module.

Further, the tube is wetted with a thin layer of (preferably silicon-containing) release agent to prevent the epoxy resin to stick to the metal surface. As epoxy resins are generally susceptible to cure, shrinkage stress would build up during curing when the resin would stick to the metal. Besides, even with minimal shrinkage temperature variations could lead to failures due to epoxy cracking as the metal and the tube sheet expand differently thermally (i.e. different thermal expansion coefficients). Excessive shrinkage would lead to gas leakage and therefore sometimes additional O-rings are integrated within the tube sheet, in the tube or within the feed caps.

Adhesion or stick is the same reason why the potting moulds, which are made of stainless steel or aluminum, are wetted thoroughly with release agent as well. The cured tube sheet would be easily damaged upon demoulding (or would simply be stuck to the mould). Said process leads to mixing of release agent, especially silicon-containing, and epoxy resin which prevents the epoxy from reacting properly and make the resulting tube sheet weaker. It is therefore important in the process of the prior art to apply only a very thin layer of release agent.

Besides of the fact that the necessity to use release agents in the processes of the state of the art increases the production costs and the complexity of the production processes, it has to be considered that the release agents are often toxic, flammable or environmentally unfriendly and are easily spread onto floors, walls, tables, etc. causing floors to be slippery. Furthermore, they act as contamination sources in processes where absence of release agents is critical. Therefore there is a strong need for improved cartridge systems.

Object of the present invention was to provide new cartridge elements and membrane separation devices comprising said cartridge elements which do not show the disadvantages of the systems of the state of the art or which show the disadvantages only to a reduced extent.

A special object of the present invention was to develop a cartridge system that does not need any release agent.

Another special object of the present invention was to provide a less complex and more economically viable manufacturing process for cartridge elements.

Also in a special problem of the present invention the cartridge element and the separation device containing said cartridge element should have a less complex design.

Another special problem of the present invention was to provide cartridge elements with higher pressure stability and increased reliability compared to standard cartridges and modules based on a non-stick situation.

To provide a more economic low-cost system is also a special problem of the present invention.

Further problems not mentioned above are apparent from the overall context of the subsequent description, examples, drawings and claims.

The inventors surprisingly found out that the problems described above can be solved by cartridge elements, separation devices disclosed herein. Essential for the new process and the new cartridge elements is the use of a new and inventive type of end caps made of a polymeric material and fixed to the cartridge element, which are also described herein.

Key to the successful new cartridge was the idea of the inventors to ensure that the end caps stick to the cartridge element. Preferably the potting resin of the tube sheet sticks to the cartridge wall as well as to the plastic end cap. The inventors found out that the use of plastic end caps at both ends of the cartridge is decisive, as the surface of the said plastic caps can ensure a sufficiently good adhesion, especially to the potting resin. This is in particular the case if the new plastic end caps are attached to the cartridge tube by building a multi-layer composite structure.

If the new cartridge elements are applied the pressure force onto the tube sheet resulting from applying a feed pressure is distributed over the entire bond surface instead of only the ledge or a groove as in the case of a non-sticking tube sheet used in the prior art. The cartridge elements of the present invention therefore exhibit much higher pressure stability and are more reliable than a standard module having a non-stick.

Due to the use of plastic end caps and the special design of the cartridge elements of the present inventions no additional O-rings to prevent gas leakage are required within the cartridge tube or within the tube sheet.

Since the inventive end caps and the adhesive fixing it to the cartridge element, preferably the potting resin, are both polymeric materials respectively made of polymeric material, it is possible to select two polymers with very similar thermal expansion coefficients and similar shrinkage behavior. This allows using the cartridges of the present invention under extreme conditions like high temperature. Under these conditions conventional cartridges with metal tube ends can only be used in the non-stick form together with release agents as explained before. Another benefit of the inventive concept is, that there is no need for use of release agents and/or O-rings within or between the cartridge tube and the tube sheet. The cartridge element of the invention can thus be used in a much broader field of application without having the cracking problems seen in the prior art.

The manufacturing process of the present invention is significantly improved compared to the processes of the prior art. As mentioned above release agents and internal O-rings are not needed. External moulds are also not necessary. This is because the plastic end caps of the present invention are designed such that they can act simultaneously as end cap of the cartridge element and before as the potting moulds, which eliminates the use of steel or aluminum potting moulds.

The presented cartridge concept is low-cost because only two low-cost end caps and a simple thin-walled cartridge tube are needed.

In short, the invented cartridge system has many advantages compared to the prior art; it doesn't need a mechanical seal, saves space, is light-weight, has less complexity, high pressure stability and is low cost. Furthermore, no additional potting moulds, mould release, grooves or O-rings are needed. Moreover, the plastic end cap guarantees a very consistent sealing.

DESCRIPTION OF DRAWING

In FIG. 3 two end caps (7a) and (7b) have been slid onto the cartridge tube (4). Thereafter potting has been conducted to form the tube sheets (6) and to fix the end caps (7a) and (7b) to the cartridge element with a multi layered structure.

FIG. 4a: FIG. 4a shows an alternative design of an inventive cartridge element with end caps (8a) and (8b) slid into the cartridge sheet (4). In FIG. 4 end caps with integrated sealing elements (O-rings (9) and (10)) are used.

FIG. 4b shows a zoomed area of FIG. 4a wherein the different parts (A) and (B) of the end cap are marked.

DETAILED DESCRIPTION OF THE INVENTION

Figure 1:
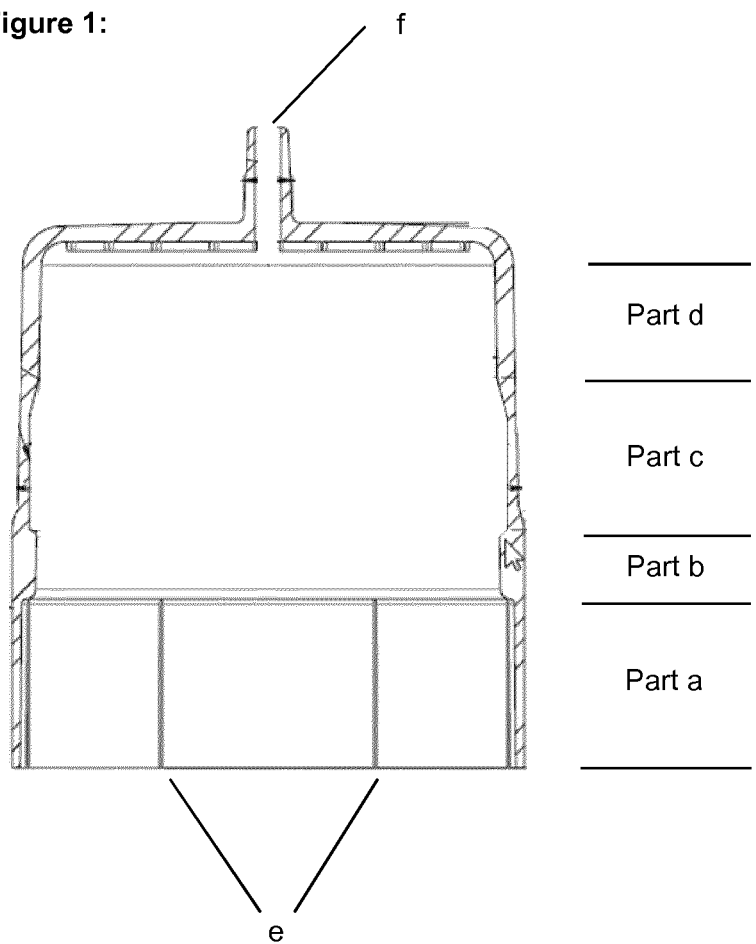
FIG. 1: Plastic end cap as preferably used in the present invention

Embodiment of the present invention are cartridge elements comprising a bundle of hollow fiber type membranes aligned in a cartridge tube and end caps at each end of the cartridge tube. The cartridge elements of the present invention are characterized in that
  the cartridge tube comprises at least one fluid inlet/outlet opening arranged between the end caps,
  the end caps are made of a polymeric material
  the end caps are fixed to the cartridge element, and
  the tube sheets at each end of the membrane bundle are jointed to the cartridge element.

As indicated before, cartridge elements according to the present invention differ from membrane separation modules. While both are used in membrane separation plants, the modules are always replaced entirely if the membranes are exhausted or if there are other reasons for an exchange. In contrast thereto a membrane separation device, which comprises a cartridge housing and a cartridge element, is usually not entirely replaced. Under normal circumstances only the cartridge element is replaced while the cartridge housing stays within the membrane separation plant. As consequence exchange of a cartridge element is less cost intensive and easier to conduct compared to an exchange of a module.

A cartridge element according to the present invention contains a cartridge tube and other parts that are fixed to it either directly or indirectly, for example via a bonding layer or the tube sheet, and which are replaced when the cartridge element is replaced. Preferably the cartridge element according to the invention comprises the hollow fibre membrane bundle and further parts that are fixed to the cartridge tube, especially the tube sheets and the end caps (7a, 7b). As the hollow fibre membrane bundle, the cartridge tube, the end caps and the tube sheets are integral part of the cartridge element they are replaced when the cartridge element is replaced.

"Fixed to the cartridge tube" and in general "fixed" with respect to the cartridge elements of the present invention means, that the "fixed" parts adhere respectively stick together. Usually they cannot be separated without destruction of the cartridge element and/or a bonding layer and/or at least one of the fixed parts.

Not part of the cartridge element of the present invention are all parts of the cartridge housing respectively the membrane separation device that are fixed to the cartridge housing and/or membrane separation device and that are not replaced when the cartridge element is replaced. Also not part of the cartridge element are parts of the membrane separation device that are neither fixed to the cartridge element nor to the cartridge housing and that are not replaced when the cartridge element is replaced. An example for a part that might be fixed to the cartridge housing or that might be an independent part of the membrane separation device which is not replaced when the cartridge element is replaces is an intermediate ring as used in U.S. Pat. No. 4,480,683.

Figure 5:
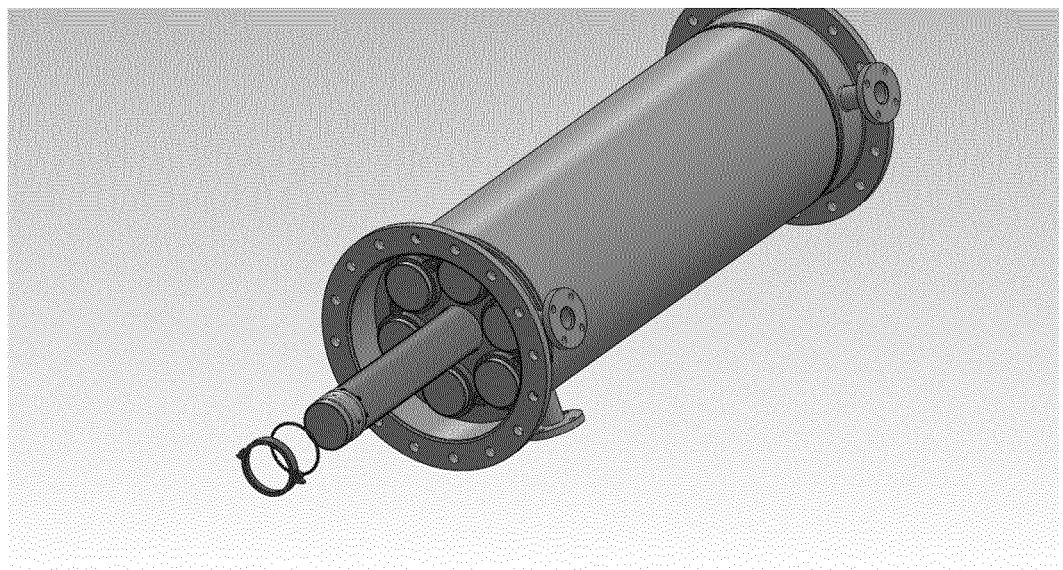
FIG. 5: Shows a multi cartridge housing.

In contrast to a module or cartridge housing, the cartridge element itself does not have connections (ports) for feed and withdraw lines. As mentioned before for installation a cartridge element into a membrane separation plant, it has to be placed into a cartridge housing which comprises said connections (ports). Different types of cartridge housings are available. On the one hand there are closed housings which completely surround the cartridge element (see FIG. 5 below). On the other hand there are cartridge housings which do not entirely surround the cartridge element. These housings may for example consist of two "adapter caps" which can be connected removable to the cartridge element and which comprise the connections (ports) for feed and withdraw lines. An example for such a housing is given in US 20120304856, FIG. 13. Further suitable modifications of cartridge housings are known to a man skilled in the art.

The plastic end caps of the present invention are fixed, i.e. they stick respectively adhere, to at last one other part of the cartridge element. Usually they cannot be removed from the cartridge element without destruction of the end cap and/or at least a part of the cartridge element, especially the bonding layer between the cartridge element and the end cap if existing.

Figure 2:
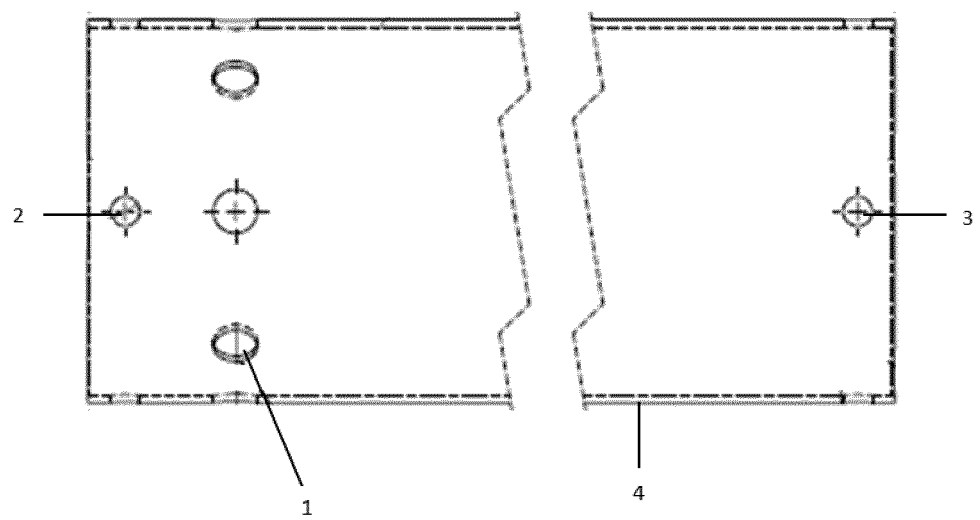
FIG. 2: Example of a cartridge tube with openings (2) and (3) for penetration of potting resin through the cartridge tube (4) and fluid inlet/outlet openings (1) allowing fluids to flow inside and outside the cartridge tube (4) when the cartridge element is used.
Figure 3:
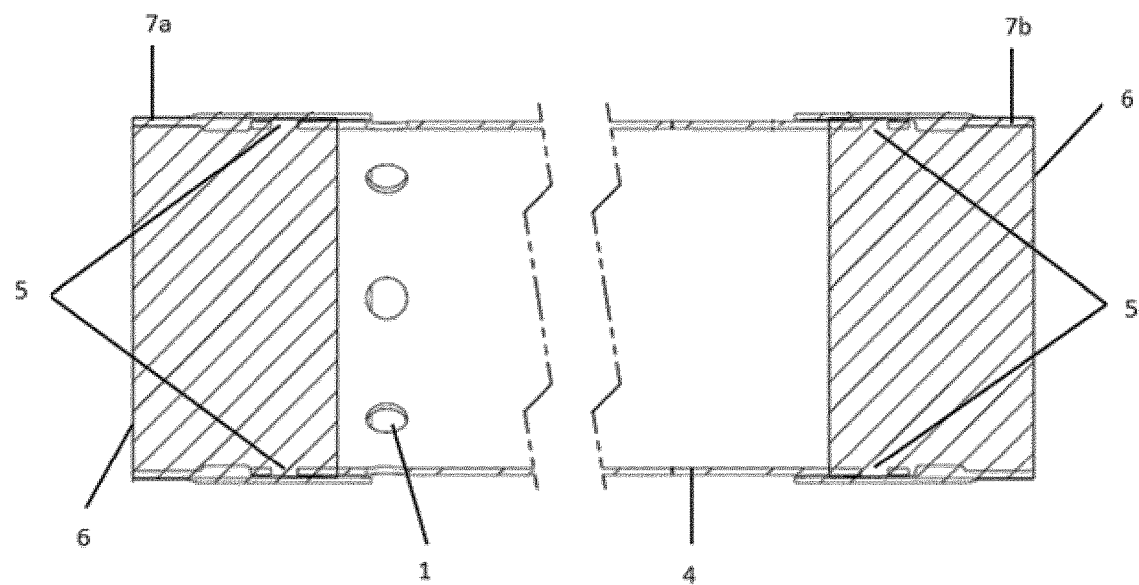
FIG. 3: Finished cartridge element with cartridge tube (4) and openings (5) which correlate to openings (2) and (3) in FIG. 2 but now filled with potting resin.

FIGS. 2 to 4 show preferred examples of cartridge tubes and cartridge elements of the present invention. The fluid inlet/outlet openings (1) serve to transfer liquids out of the cartridge tube (4) or into the cartridge tube (4). Preferably the cartridge elements of the present invention are used as "inside out" cartridges, i.e. the hollow fiber membranes are used as bore feed membranes. In case a mixture comprising at least two different components is fed into the bores of the membrane. Components having a higher permeability permeate through the membranes and reach to the space between the membranes and the inner wall of the cartridge tube (4) and to opening (1) of the cartridge tube which serves as an outlet opening allowing the permeate to pass through the wall of the cartridge tube (4) into the space between the outer surface of the cartridge tube and the cartridge housing and from there to the permeate outlet of the cartridge housing. The component with the lower permeability is further transported through the bore of the membrane to the other end of the membrane and from there to the retentate outlet of the membrane separation device or to a further processing step.

It is, however, also possible to use the cartridge elements of the present invention in an opposite direction. In that case a mixture comprising at least two different components is fed through the cartridge tube opening (1) into the space between the inner wall of the cartridge tube (4) and the outer surface of the hollow fiber membranes. Higher permeable components then permeate through the membrane into its bore and are further transported to the end of the membrane bores to be further treated or removed as permeate stream. The less permeable components concentrate in the space between the inner wall of the cartridge tube (4) and the outer surface of the hollow fiber membranes and are preferably removed through a second opening in the cartridge tube (opening not shown in the Figures).

It is obvious for a man skilled in the art that multiple inlet/outlet opening (1) can be used. An optimum number can be found out very easily by a man skilled in the art.

There are no special restrictions how to obtain the openings (1). They can be drilled or pressed or made by other known techniques. There are also no special requirements with regard to the shape of the openings. Preferably, however, the openings should be large enough to not cause any significant pressure drop.

Different materials like metal or plastic can be used for the walls of the cartridge tube (4). Plastic cartridge tubes are light weight but require a higher wall thickness if high pressures are applied. Therefore it is preferred to use metal tubes, in particular (stainless) steel or aluminum as material. Said materials allow using very thin tube walls at the required pressure ranges. The wall thickness of the metal cartridge tube is therefore preferably in a range of from 0.5 to 10 mm, preferably 0.5 to 8 mm, particular preferred 1 to 5 mm and very particular preferred 1 to 3 mm.

The cartridge tube (4) may have different shapes and forms. Preferably it has a cylindrical form.

The inner diameter is preferably between 10 and 250 mm, particular preferred between 30 and 150 mm and very much preferred between 50 and 110 mm. The inventors found out that at larger diameters the curing reaction of the potting resin, which is exothermic, might go up dramatically and might cause too large thermal variations and/or excessive shrinkage. Too low diameters are economically inefficient.

Beside of the cartridge tube (4), the inventive cartridge elements comprise a bundle of hollow fiber membranes. There is no special restriction with regard to the hollow fiber membranes. In principle any type of polymer membrane could be used.

The fiber diameter can also be varied. It is, however, preferred to ensure at least a packing density within the tube sheet of more than 40% on the 4" scale respectively similar ratios for other scales.

Which type of hollow fiber membranes can be used depends on the separation problem. The membranes of the present invention can be used for liquid fluids as well as for gaseous fluids. There are several types of membranes known in the art and commercially available.

For gas separation it has been shown that gas separation membranes made of polyimides are particular useful. Especially preferred polyimides are obtained by reacting
at least one dianhydride, selected from the group consisting of 3,4,3'4'-Benzophenone tetracarboxylic acid dianhydride, 1,2,4,5-Benzene tetracarboxylic acid dianhydrid, 3,4,3'4'-Biphenyle tetracarboxylic acid dianhydride, Oxydiphthalicacid dianhydride, Sulfonyldiphthalicacid dianhydride, 1,1,1,3,3,3-Hexafluor-2,2-propylidene diphthalicacid dianhydride
and
at least one diisocyanate selected from the group consisting of Toluene-2,4-diisocyanate, Toluene-2,6-diisocyanate, 4,4'-Methylendiphenyldiisocyanate, 2,4,6-Trimethyl-1,3-phenylenediiso-cyanate, 2,3,4,5-Tetramethyl-1,4-phenylenediisocyanate.

Especially preferred are polyimides comprising:

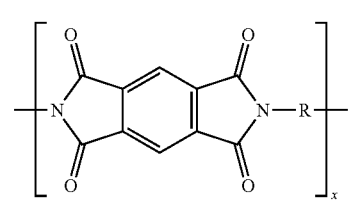

(A)

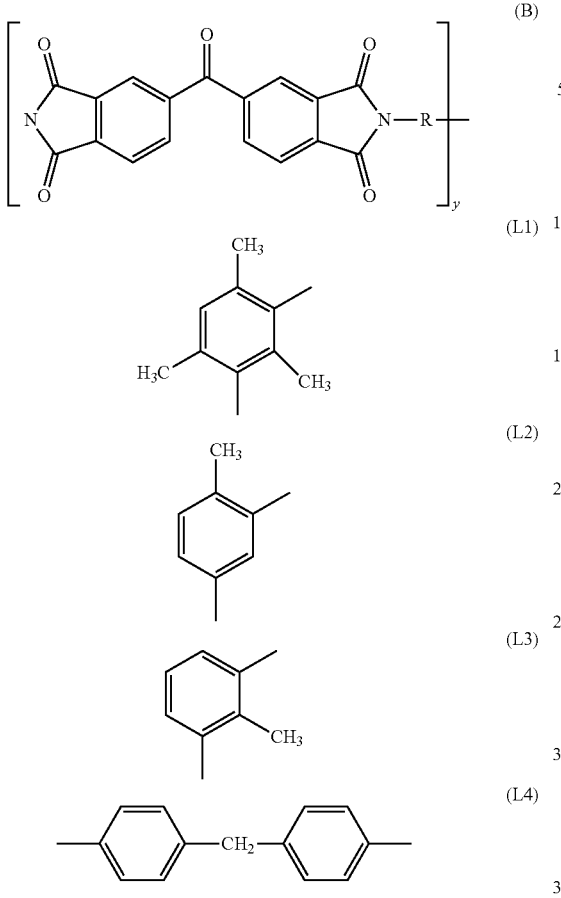

wherein 0≤x≤0.5 and 1≥y≥0.5 and R represents one or more identical or different radicals selected from the group consisting of the radicals L1, L2, L3 and L4.

Most preferred are polymers with x=0, y=1 and R consisting of 64 mol % L2, 16 mol % L3 and 20 mol % L4. This polymer is commercially available under the name P84 or P84 Typ 70 from Evonik Fibres and is registered under CAS-number: 9046-51-9. Another most preferred polymer is characterized by x=0.4, y=0.6 and R consisting of 80 mol % L2, 20 mol % L3. This polymer is commercially available under the trade names P84HT or P84 HT 325 and is registered under CAS-number: 134119-41-8.

The cartridge elements of the present invention comprise plastic end caps. In general two types of end caps can be used. The first type, which is the preferred type, is slid onto the cartridge tube. The second type is slid into the cartridge tube. While the second type saves space valuable separation surface for the membranes is lost compared to the first type.

The inventors found out, that choosing the right combination of end cap material and adhesive, the potting resin is preferably used as adhesive, leads to significant improvement in the cartridge performance. It is thus preferred that the materials have good affinity to each other to provide enough physical adhesion ("stick") and that their thermal expansion coefficients (CTE) do not differ too much. Preferably the end cap material should have equal or lower thermal expansion coefficient than the adhesive, preferably than the potting resin. Particular preferred the CTE of the polymer of the adhesive, preferably of the potting resin, is at most 3 times higher, very particular preferred at most 2 times higher and most preferred at most 1.5 as high as the CTE of the polymer of the end cap.

In a preferred embodiment of the present invention the end cap is made of a polymer or polymer blend or polymer mixture which is selected from polyphenylene sulfide or a blend of polyphenylene oxid and polystyrene or polymers having similar properties.

Especially preferred polymers or polymer blends or polymer mixtures exhibit one, preferably at least one, especially preferred all, of the following properties:
- it is injection moldable
- its maximum thermal expansion coefficient is $1\times10^{-4}$ 1/K; very preferred $5\times10^{-5}$ or lower and/or its heat deflection temperature, i.e. a temperature up to which the material keeps it shape, is at least 140° C., preferably higher than 140° C. to 300° C.
- end caps made out of it have minimal shrinkage. Preferably the shrinkage should be less than 1%, particular preferred less than 0.5%.

Other preferred criteria for selection of the material for the end caps are that the mould made of the polymer is dimensionally stable in contact with the gas stream to separate including hydrocarbons and $H_2O$-vapor.

To improve the dimensional stability it is possible to add up to 30% by weight of glass fibers or other reinforcing materials to the polymer. Reinforcement by glass fibers is preferred.

As mentioned before, it is preferred that the polymer for the end cap and the polymer for the adhesive, preferably the potting resin, have good affinity to each other and have similar thermal expansion coefficients (CTE).

It is therefore especially preferred that the potting resin is selected from the group consisting of epoxy resins or polyurethane resins or resins having similar properties.

Particular preferred the potting resins should have one, preferably at least one and especially preferred all of the following properties:
- its glass transition temperature is >80° C., preferably 80° C. to 250° C.
- Flat sample bars (according to standard test ASTM D648-07) made from the potting resins have a flexural strength >70 MPa, preferably >70 MPa to 200 MPa at room temperature
- Flat sample bars (according to standard test ASTM D648-07) made from the potting resins have an elongation at break >8%, preferably 8% to 40%
- its curing process starts at temperatures below 30° C., preferable 15 to 25° C.,
- a fully cured potting made from the potting resin in a mould having an inner diameter of 110 mm and filled with approximately 500 grams of resin and optional fibers has a shrinkage below 0.5%, preferably 0 to 0.3%.
- its gel time is >1 hour
- its viscosity after mixing of resin and hardener is <2000 cPs or mPas.
- if the resin comprises a filler, the filler does not segregate upon centrifuging with 20 to 40 G.

Further criteria for the selection of appropriate potting resin can be:
- The cured resin should be suitable for knife cutting before any post-treatment (e.g. with the aid of an IR-lamp or hot air gun).
- The resin should be resistant against $CO_2$ (except $CO_2$ and $H_2O$ mainly in trace amounts) up to 50° C.
- Temperature post-cure of the resin should stay below 140° C. (preferably 80-100° C.).
- The resin should be low-cost and widely available.

The inventors found out, that the end caps have a better adhesion to the cartridge element if they are fixed to the cartridge element by building a multi-layer composite structure which comprises:
- a cap layer which is formed by the end cap
- a fixing layer between the end cap and the cartridge tube
- a tube layer, formed by the cartridge tube, and optionally but preferably
- the tube sheet layer, formed by the resin and the fiber bundle.

Suitable potting resins that match the criteria defined above are an epoxy resin from Hexion (resin EPIKOTE 828LVEL with curing agent EPIKURE 3055) and an epoxy resin from Ebalta (Resin LH1000 and curing agent mixture (5/1) W400/W15.

In a preferred embodiment where the end cap is slid onto the cartridge tube the cap layer represents the outset layer of the cartridge.

In both preferred embodiments of the present invention, i.e. placing the cap inside and outside, it is possible to use the same or different materials for the fixing layer and the tube sheet. To join the end cap to the tube any paste-like adhesive can be used (e.g. polyurethane, epoxy, hot melt, silicone).

It is preferred, however, to use the same resin to produce the fixing layer and the tube sheet. This has several advantages because the number of different materials is reduced and the production process is simplified. Even if different materials are used for the fixing layer and the tube sheet it is preferred that all materials are selected from the materials described as suitable for the fixing layer above.

Preferably the fixing layer has a thickness of from 0.5 to 3 mm, particular preferred of from 0.8 to 2 mm. The fixing layer may be composed of different layers of the same or different adhesives. Preferably it is a single layer.

It is possible to glue the end caps, i.e. the parts of the end caps which overlap the cartridge tube before the cap is placed onto or into the cartridge tube. This alternative is especially preferred if the end cap is placed into the cartridge tube.

If the end cap is placed onto the cartridge tube, cartridge tubes without openings in the region where it is covered by the end cap can be used. It is, however, especially preferred that the cartridge tube comprises at least one opening (see (2) and (3) in FIG. 2), arranged in a region where the cartridge tube is covered by the end cap and which allows the potting resin to penetrate through the cylindrical tube into a hollow space between the outer surface of the cartridge tube and the inner surface of the end cap. This design allows a very simple and efficient production process as will be explained below. In addition this design ensures that there is an interconnection between the tube sheet and the fixing layer. In other words, it is achieved that the tube is covered on both sides with the same resin and is securely integrated to the tube sheet and the end cap.

There is no special restriction with regard to the number, form and size of the opening (2) or (3) as long it is ensured that the resin can freely flow between the tube and the end cap. The inventors found out, that good results are achieved if at least 4 holes of a diameter of at least 4 mm are arranged around the circumference of the cartridge tube under one end cap.

A very much preferred design of an end cap of the present invention that is slid onto the cartridge tube is shown in FIG. 1.

The end cap comprises a first part ((a) in FIG. 1) with an inner diameter which is larger than the outer diameter of the cartridge tube and a second part ((b) in FIG. 1) with an inner diameter smaller than that of the first part (a) and smaller than the outer diameter of the cartridge tube (4). The second part (b) with the smaller inner diameter cannot be slid onto the cartridge tube. The position of transition point from the wide to the small diameter determines how far the end cap can be slid over the cartridge tube.

Because the inner diameter of the first part (a) of the end cap is wider than the outer diameter of the cartridge tube, a space is preferably formed between the inner surface of the end cape and the outer surface of the cartridge tube. Said space can be used to form the fixing layer.

It is preferred that the end cap is arranged centered on the cartridge tube. To achieve this, the end cap and/or the cartridge tube may comprise spacers ((e) in FIG. 1) that center the cap around the tube and leave space between the outer surface of the cartridge tube and the inner surface of the first part of the end cap. It is particular preferred and cheaper if the end cap comprises such spacers. There is no particular limitation for the spacers. There might be ridges cross to or parallel to the cartridge tube. Ledges or grooves might also be used.

Beside part (a) and part (b) there is a third part (c) of the end cap. This part does not slid over the cartridge tube but slides over at least some part of the hollow fiber membrane bundle that protrudes from the cartridge tube. The third part (c) may at least partially have a smaller or the same or a wider inner diameter than the second part (b). Preferably the third part (c), as shown in FIG. 1, has a wider inner diameter than part (b) which allows forming a tube sheet with an optimum diameter.

If the end cap is slid onto the cartridge tube, the outer diameter of the third part (c) of the end cap is preferably smaller than the outer diameter of the first part (a). Part (c) of the end cap is preferably used to place one or more sealing elements, preferably O-rings, in that region (see for example FIG. 6).

The end cap optionally comprises a fourth part (d) which follows after the third part (c). Said part neither covers the cartridge tube nor the hollow fiber membranes. Part (d) therefore forms a free space (container) that can be filled with the potting resin during the potting process. The fourth part (d) forms a reservoir/container for the potting resin and helps to regulate the potting process. It is therefore preferred to have said part at the end cap.

To allow the potting resin to be filled into the end cap respectively the assembly of end cap, fiber bundle and cartridge tube the end cap preferably comprises an inlet opening for the potting resin (see (f) in FIG. 1). It is preferred that the inlet opening has a design allowing it to connect, for example with hoses, to a source of the potting resin. Technical solutions for filling the end cap with potting resin like prefilled disposable plastic bags, a central slinger plate or similar solutions can easily be found by a man skilled in the art.

Finally it is preferred that the end cap comprises at least one marking (not shown in FIG. 1) that shows where the cutting off after the potting has to be done. Since the transition point between parts (a) and (b) of the end cap determines how far the end cap can be slid onto the cartridge tube and it can be predetermined how far the hollow fiber membranes protrude the cartridge tube, said marking allows to precisely determine the right position for cut of one part of the end cap to open the bores of the hollow fiber membranes.

If the end cap is designed as described above it usually does not comprise an integrated sealing element for separation of permeate and retentate atmosphere after introduction of the cartridge element into the membrane separation device. The present invention, however, also covers plastic end caps comprising integrated sealing elements like O-rings (see for example FIG. 4) or grooves or similar devices for fixing sealing elements.

Figure 4A:
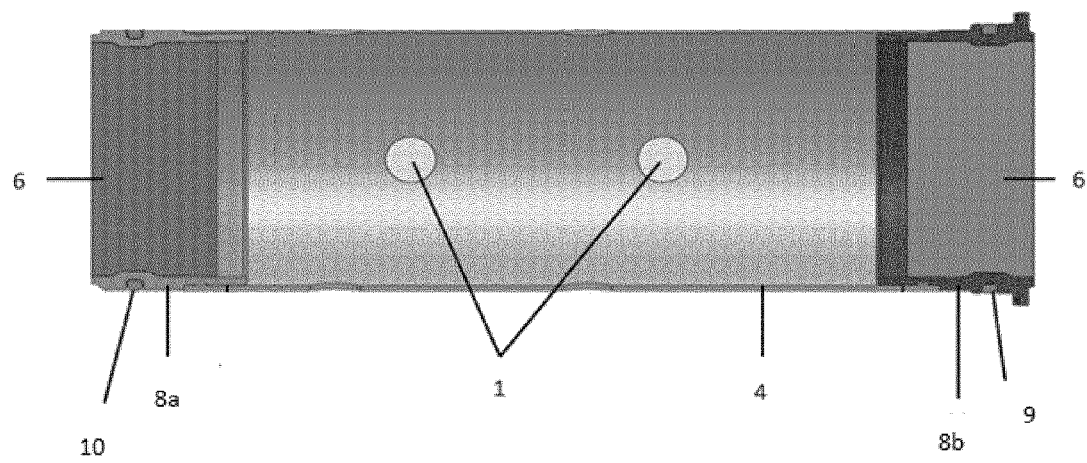
Figure 4B:
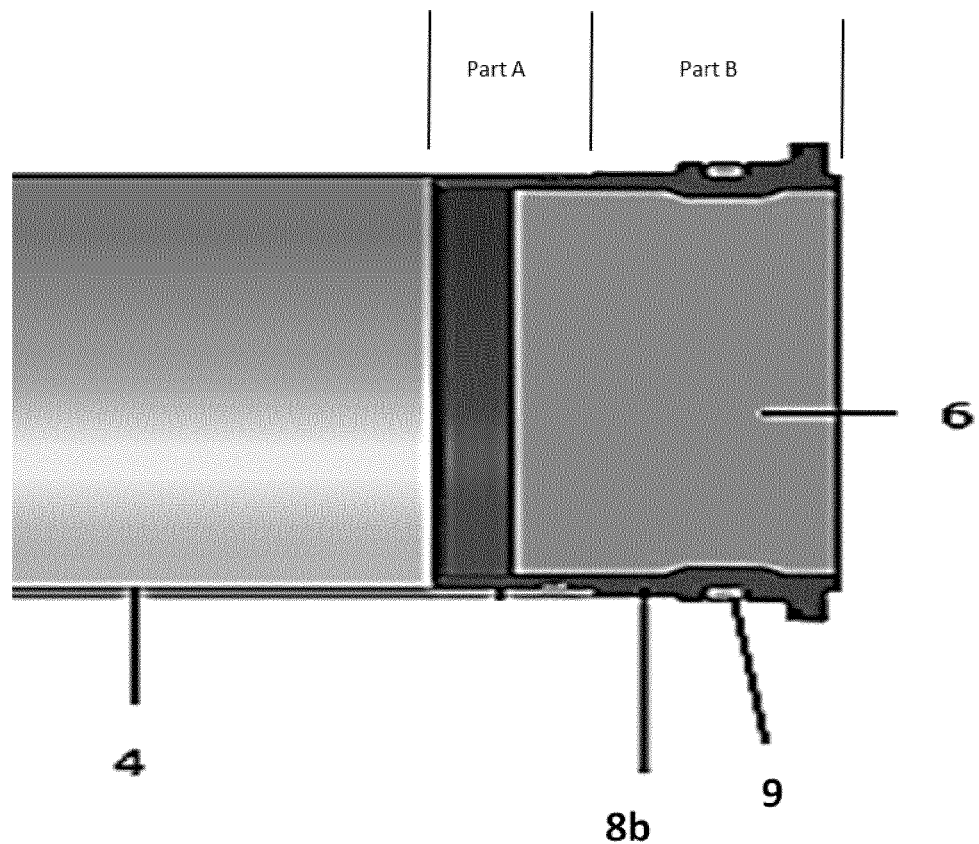
FIG. 4b.

Another preferred design of an end cap of the present invention that is slid into the cartridge tube is shown in FIGS. 4a and 4b.

The end cap comprises a first part (see (A) in FIG. 4b) with an outer diameter which is narrower than the inner diameter of the cartridge tube (4) and a second part (see (B) in FIG. 4b) following after part (A) and not being covered by the cartridge tube. Parts (A) and (B) may have identical outer diameters. Optionally the second part (B) may have an outer diameter wider than that of the first part (A). In that case the second part (B) with the wider outer diameter may be construed in a manner that it cannot be slid into the cartridge tube. The position of transition from the narrow to the wide diameter determines how far the end cap can be slid into the cartridge tube.

The outer diameter of the first part (A) of the end cap is narrower than the inner diameter of the cartridge tube. Preferably it is narrow enough to form a space between the outer surface of part (A) of the end cap and the inner surface of the cartridge tube. Said space can be used to form the fixing layer.

To allow the potting resin, if used as fixing layer, to flow into this space the level of potting resin has to be higher than the end or the lowest opening of the end cap. To prevent the resin from leaking out, it is preferred that the end cap has to join to the tube to make a seal with a paste-like adhesive prior to potting. Alternatively an end cap with at least one opening can be used which allows penetration of potting resin into the space between end cap and cartridge tube.

It is preferred that the end cap is arranged centered into the cartridge tube. To achieve this the end cap and/or the cartridge tube may comprises spacers (not shown in FIG. 4) in the first part (A) that center the cap around the tube and leave space between the inner surface of the cartridge tube and the outer surface of the first part of the end cap. It is particular preferred and cheaper if the end cap comprises such spacers. There is no particular limitation for the spacers. There might be ridges cross to or parallel to the cartridge tube. Ledges or grooves might also be used.

Analogue to the end caps described above, i.e. the end caps sliding onto the cartridge tube, the end caps sliding into the cartridge tube may comprise a part (C) (not shown in FIG. 4) which forms a free space (container) that can be filled with the potting resin during the potting process and/or an inlet opening for the potting resin and/or at least one marking that shows where the cutting off after the potting has to be done. Said parts of the end cap may be construed as described above for the end cap sliding over the cartridge tube.

If the end caps are designed as described above they usually do not comprise an integrated sealing element for separation of permeate and retentate atmosphere after introduction of the cartridge element into the membrane separation device. The present invention, however, also covers plastic end caps comprising integrated sealing elements like O-rings (see for example FIG. 4) or grooves or similar devices for fixing sealing elements.

The cartridge elements of the present invention are preferably produced by a process comprising the steps
a) providing a bundle of hollow fiber membranes and a cartridge tube, preferably with at least one fluid inlet/outlet opening
b) sliding the membrane bundle into the cartridge tube
c) mounting plastic caps, preferably end caps as described above, on both sides of the assembly of step b)
d) placing the assembly obtained in step c) into a centrifuge in a manner that ensures that the assembly is hold together
e) filling a potting resin into both end caps and curing during centrifugation
f) cutting off the end parts of both end caps to open the bores of the hollow fiber membranes.

In step a) bundle of hollow fiber membranes is packed. Said process is well known in the art. As mentioned above any kind of hollow fiber membrane can be used. Preferred membranes have been described above.

The manufacturing process of hollow fiber membranes is particular preferred conducted as described in WO 2011/009919 and/or EP 12183794. Both documents are incorporated by reference.

A cartridge tube as described in more detail above is also provided in step a). Said cartridge tube comprises all necessary opening as described above.

In step b) the cartridge tube is filled with the membrane bundle. Filling of a cartridge tube with a membrane bundle is a well-known process in the art. Preferably the cartridge production process is started by packing hollow fiber membranes together into a bundle, cutting them to a certain length and sliding the bundle into a Nylon sleeve or sock. The sleeve (kind of stockings) is only to prevent damage to the fibers during handling. The bundle is slid into the cartridge tube and centered.

Preferably the cartridge element comprises a porous material between cartridge tube and fiber bundle. This porous material is used as a spacer to improve distribution of the potting resin and to prevent the bundle from shifting during potting. All kinds of material fulfilling these requirements can be used. Preferably a piece of polypropylene mesh is cut, folded and placed between cartridge tube and fiber bundle.

To avoid that the potting resin flows up within the bores of the hollow fiber membranes it is preferred that the openings of the bores are closed with a sealing agent before step c) is conducted. Particular preferred hot paraffin wax or a, preferably quick curing, epoxy or polyurethane resin can be used for this.

For step c) plastic end caps are needed. These end caps are preferably made by injection moulding, a well-known process, and are preferably made of a material and are in a shape as described above.

It has been found that it is possible to increase the bonding between the end cap and the cartridge element if the end cap is pre-treated before it is mounted on or in the cartridge element. It is particular preferred that the end caps, especially at least those parts of the surface of the end caps that get into contact with the fixing, are pre-treated with a flame or chemically, preferably with an acid, or mechanically, preferably by sand blasting, to purify the surface, e.g. to remove contaminations (e.g. like finger fat), to slightly chemically modify/activate the surface and/or optionally to roughen it in order to improve its adhesion/stick to the cartridge element. It should carefully be avoided to touch or contaminate the treated surface anymore after this treatment.

In a first preferred embodiment the end caps are then slid onto the tube. Preferably end caps with a first part (a) having a wider inner diameter and a second part with a narrower inner diameter as described in more detail above are used.

Said caps are slid onto the tube as far as they can go, i.e. until the part (b) of the end cap with smaller diameter is reached.

As described above, in a second preferred embodiment of the invention a cap is used which can be slid into the tube. Said cap preferable also comprises some kind of marking or groove or ledge or similar devices to ensure correct placing of the cap.

As described above it is preferred to use end caps that comprise spacers at the part of its surface that gets into contact with the fixing layer. Said spacers are designed in a manner that ensures that the cap is centered onto or into the tube and leaves space for the resin forming the fixing layer to flow equally between tube and cap.

In step d) the entire assembly as obtained after step c) is placed into a fixture in a centrifuge that holds the assembly together. The centrifuge fixture prevents the caps from sliding off the tube due to the large G-forces during centrifuging. The fixtures together with the preferably comprised spacers of the caps ensure that the caps are centers on or in the tube.

In step e) potting is conducted. For this it is necessary that the potting resin is filled into the end caps. This could be done in various ways.

For example hoses can be attached to the end caps and to a central slinger plate that distributes the potting resin upon centrifuging. An alternative way is to mount two prefilled disposable plastic bags close to both end caps. It is also possible to prefill the end caps at least partially before potting. Other technical solutions can easily be found by a man skilled in the art.

The cartridge is potted at a centrifuge with a G force preferably exceeding 10 G. A centrifuge speed of preferably 100 to 500 rpm, particular preferred at 150 to 400 rpm and particular preferred at 200-350 rpm.

The temperature of the environment of the potting apparatus when starting potting should be below 40° C., preferably at 5 and 30° C., particular preferred at 10 to 25° C. and very particular preferred at 15 to 25° C. The temperature should be that low to prevent excessive exotherms with specific potting resins. In another embodiment, however, potting resins that work as well and need heating to initiate cure and have manageable exotherms may also be used. Since these cause more energy input, the first alternative is preferred.

To fill the potting resin into the end caps takes several minutes to several hours. Preferably 1 minute to 1 h, particular preferred 5 min to 45 min, particular preferred 10 min to 30 min.

It is preferred that the amount of potting resin exactly matches the empty volume of the end caps. This is to avoid overflowing fluid inlet/outlet openings with potting resin in cases where the inlet/outlet openings are arranged close to the end caps. As additional advantage waste of potting resin is avoided.

After curing of the potting resin is finished the cartridge is taken out from the centrifuge and cooled down, preferably naturally.

In step f) the end ends of the end caps and the tube sheet are cut off to open the bores of the hollow fiber membranes. As mentioned above it is preferred to use end caps with a marking that tells where the final cut has to be made in order to guarantee having always the same cartridge length.

In a preferred process the cartridge is first roughly cut with a band saw below the cut line. The end cap is than finally cut until the cut line. In order to obtain a proper cut and not damage it is particular preferred that the fibers before and/or during cutting off the end caps and tube sheet are heated to slightly above their Tg. Preferably heating before cutting is done for at least 5 minutes. Heating can be done by for example an IR-lamp or hot air gun.

The cartridge elements of the invention are intended for use in membrane separation devices. Said devices preferably comprise single or multi cartridge housings (example see FIG. 5). The cartridge housings are preferably made of pressure stable tubes and preferably comprise feed and retentate caps. Preferred materials for the tube of the cartridge housing are stainless steel or aluminum. It is preferred that the inner shape of the cartridge housing matches as much as possible the outer shape of the cartridge element. The inner diameter of the cartridge housing preferably is wider than the outer diameter of the cartridge element to allow placing a sealing means, preferably an O-ring, between the inner surface of the cartridge housing and the outer surface of the cartridge element. This sealing element is necessary to separate permeate and the retentate atmosphere around the cartridge element. There are several design options for cartridge housings. One option is to use housings with grooves wherein O-rings can be placed. Another option is to use housings wherein the O-ring is integrated. It is also possible to use feed and retentate caps with integrated O-rings. Corresponding technical solutions are known in the art and can easily be found by a man skilled in the art.

Most preferred, however, is to use cartridge elements comprising end caps having a part (see FIG. 3) having a smaller outer diameter than the outer diameter in the region where the end cap overlaps the cartridge tube (see FIG. 3). This smaller outer diameter forms a space for a sealing means, preferably an O-ring, between the outer surface of the end cap and the inner surface of the cartridge housing. Said design has several advantages over other designs. One advantage is that the thinner outer diameter in the region where the O-ring is placed ensures that the O-ring cannot slide further than to the place where the outer diameter of the end caps widens out, i.e. the O-ring cannot slide to a place behind the fluid inlet/outlet openings. Another advantage is that the O-ring can simply be slid over the cartridge element and simple cartridge housings can be used. Thus, there is no need to use expensive housings or housing caps with integrated sealing elements or the like. A third advantage is, that the use of plastic end caps according to the invention leads to ends of the cartridge element with exact shapes and without damages as in the processes of the prior art. Thus, it is very easy to exactly match the outer shape of the cartridge element and the shape of the cartridge housing reproducible. This is very difficult with cartridge elements of the state of the art. Thus, the cartridge elements of the present invention allow ensuring a very good sealing.

Figure 6:
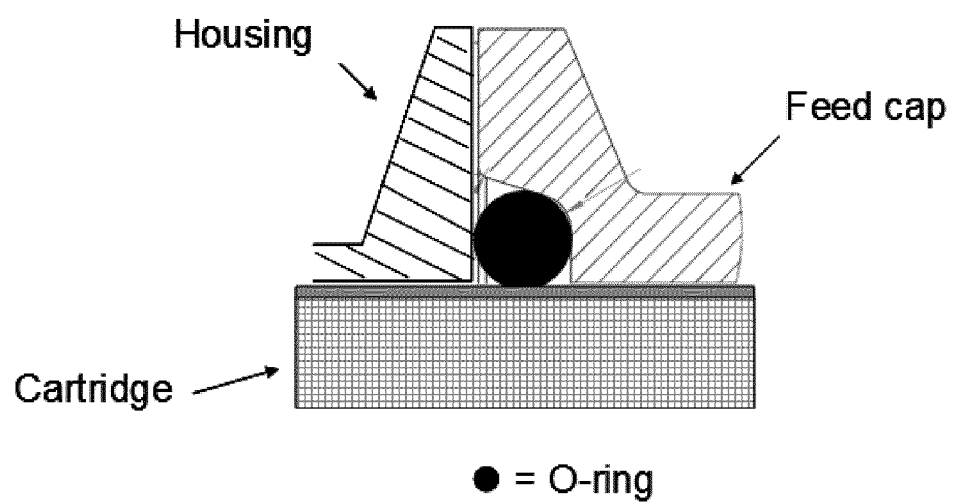
FIG. 6: Shows an option to arrange an O-ring between cartridge element, cartridge housing and feed cap.

In a preferred embodiment O-rings are used to seal the cartridge elements inside the housing, by sliding an O-ring over each end of the cartridge after the cartridge is placed into its housing. Subsequently feed/retentate caps are mounted. Usually two O-rings per side are needed to seal in all directions. However, the groove of the feed/retentate caps is designed such that a single O-ring seals in all required directions, as shown in FIG. 6. The O-ring is compressed by using clamps or a flange system. Only one O-ring per side is needed and is sealing into three directions. Alternatively, the O-ring could be made integrated into the end cap as well by changing the injection mould design. To minimize complexity and reduce cost, it is preferred to have the O-ring groove within the housing design.

The membrane separation elements of the present invention can be used to separate different kind of fluid mixtures.

It can be used for separation of liquid fluid mixtures comprising water. Preferably, however, it is used for separation of gas or vapour mixtures. Particular preferred it is used for biogas upgrading, He— or $H_2$ recovery or upgrading, syngas ratio adjustment, $N_2$- or $O_2$-enrichment, gas drying or $CO_2$-removal for gas stream like flue gas.

Measuring Methods:

A) Coefficient of thermal expansion

The CTE is determined according to ISO 11359-2.

B) Temperature stability

Temperature at which material starts to deform, also called the heat deflection temperature and is related to its glass transition temperature. The heat deflection temperature is determined by the standard method ASTM D648.

C) Shrinkage of polymers for the end cap and the cured potting resin.

Dimensional molding shrinkage of a thermoplastic part is a typical phenomenon related to the injection molding processes, caused by the volumetric shrinkage, during and after molding cycle. Shrinkage is measured as a difference between the inner diameter of mould and the outer diameter of the fully cured potting using a micrometer.

D) Glass transition temperature of potting resin

The glass transition point is determined by DSC according to ASTM E1356 or by DMA according to ISO 6721:11 where the peak of the tan(δ) is taken as the glass transition point.

E) Flexural strength of potting resin

Measurement is done according to standard method ISO 187.

F) Elongation at break

Same measurement method as for flexural strength.

G) Curing at temperature of potting resin

Temperature where curing of the potting resin starts.

H) Gel time of potting resin

A cup with a diameter of 4 cm and 10 cm high is filled with 200 grams of the potting resin and a stick is inserted. When a stick made of glass of 5 mm thick and 15 cm high keeps standing up the resin is considered to be gelled.

I) Viscosity of potting resin after mixing

The viscosity is measured according to standard method DIN 53211 at 20° C. using an efflux cup.

EXAMPLES

The examples disclosed below are intended for clarification and deeper understanding of the present invention. They must not be construed in any way that restricts the scope of the present invention.

Example 1

Manufacture of Cartridge Element

A bundle P84 HT-325 hollow fiber membranes, available from Evonik Fibers GmbH, was formed by cutting the fibers to the desired certain length and sliding the bundle into a Nylon sleeve. The bundle was slid into a stainless steel cartridge tube having an inner diameter of about 100 mm and centered. The cartridge tube was thin-walled below 2.5 mm and had at both ends a series of small 8 mm holes, see (2) and (3) in FIG. 2. Said holes allowed penetration of the potting resin through the cartridge tube. At one end of the cartridge tube a second row of holes (see (1) in FIG. 2), visible also after mounting of the end caps, was drilled through which the permeate gas will flow out during operation of the cartridge. A piece of polypropylene mesh was cut, folded and placed between cartridge tube and fiber bundle. All fiber ends were than closed with hot paraffin to prevent the potting resin from flowing up within the fiber bores during the potting process.

End caps made of Noryl (PPO/PS-Blend) and designed according to FIG. 1 where used. Before mounting the plastic end caps onto the cartridge tube, they were first flame treated for a few seconds to remove contaminations (e.g. like finger fat) and to slightly chemically modify/activate the surface to obtain a better adhesion.

The entire cartridge was then placed into a fixture in a centrifuge that holds the assembly together.

As potting resin an epoxy resin (EPIKOTE Resin 828LVEL with curing agent EPIKURE 3055 from Hexion) was used. For filling the end caps with epoxy resin hoses were attached to the end caps and a central slinger plate that distributes the epoxy resin upon centrifuging. The cartridge was potted at a centrifuge speed of 200-350 rpm at room temperature (<30° C.). The epoxy resin was added to the slinger plate all at once and it took about 20 minutes to fill up the caps. The amount of epoxy exactly matched the empty volume up to the permeate holes. After curing was finished during centrifugation, the cartridge was taken out from the centrifuge, cooled down naturally and ends were cut-off.

Since end caps were used with a marking line that tells where to final cut had to be done in order to guarantee having always the same cartridge length. The cartridge was first roughly cut with a band saw below the cut line. The end cap was finally blade cut until the cut line. To obtain a proper cut and not damage the fibers while cutting the tube sheet was heated to slightly above its Tg for at least 5 minutes. The cartridge was now ready for use.

FIG. 3 shows a schematic drawing of the final cartridge after being cut. The striped area (6) shows the tube sheet. The cartridge tube is filled with resin just beneath the inlet/outlet opening (1). The resin filling height was symmetrical and both ends had the same filling height. The holes in the cartridge tube (5) under the end caps allowed the epoxy resin to flow into the space between cap and tube. In this way, the tube was covered on both sides with epoxy resin and was securely integrated to the tube sheet and the end cap in regions where it builds a multilayer system of cap, epoxy, tube and again epoxy. The holes (5) in the tube ensure that the outside and inside of the tube gets properly interconnected.

Example 2

Application Test

The cartridges obtained in example 1 were thoroughly pressure tested using a pressure cycle test setup. After holding the pressure at 60 bar for one hour, 1000 cycles were done between 0 and 60 bar (hold 8 seconds at 60 bar, cycle time about 20 seconds) where after pressure was held at 60 bar again for 1 hour. All cartridges passed the pressure test.

LIST OF REFERENCE NUMERALS

1: Fluid inlet/outlet opening in cartridge tube
2: Opening in cartridge tube for transfer of potting resin, after potting covered by end cap
3: Opening in cartridge tube for transfer of potting resin, after potting covered by end cap
4: Cartridge tube 5: Openings (2) and (3) in cartridge tube filled with potting resin
6: Tube sheets (Pottings)
7a, 7b: End caps slid onto the cartridge tube
8a, 8b: End caps slid into the cartridge tube
9: O-ring
10: O-ring
A: Regions of end caps (8a) respectively (8b) covered by the cartridge tube
B: Regions of end caps (8a) respectively (8b) not covered by the cartridge tube
a, b, c, d: Different regions of an end cap which is placed onto the cartridge tube
e: Spacer
f: Inlet for potting resin

What is claimed is:

1. A cartridge element comprising a bundle of hollow fiber type membranes aligned in a cylindrical cartridge tube, tube sheets at each end of the membrane bundle, and end caps at each end of the cartridge tube, wherein
the cartridge tube has a wall thickness of 0.5 to 10 mm and comprises at least one fluid inlet or fluid outlet opening arranged between the end caps,
the end caps are made of a polymeric material
the end caps are permanently fixed to the cartridge element,
the tube sheets comprise a potting resin and are permanently fixed to the cartridge element, and
at least one end cap is partially slid onto or into the cartridge tube, said end cap comprises a cylindrical section with an inner diameter which is wider than an outer diameter of the cartridge tube or a cylindrical section with an outer diameter which is narrower than an inner diameter of the cartridge tube, and said cylindrical section of the end cap comprises spacers that center the cap onto or into the cartridge tube and leave space between the cartridge tube and the cylindrical section of the end cap which can be filled with said potting resin.

2. The cartridge element according to claim 1, wherein at least one end cap is fixed to the cartridge element by building a multi-layer composite structure which comprises:
a cap layer which is formed by the end cap
a fixing layer between the end cap and the cartridge tube, preferably composed of the same resin also used to form the tube sheet
a tube layer, formed by the cartridge tube, and
a tube sheet layer, formed by the potting resin and the fiber bundle.

3. The cartridge element according to claim 2, wherein the cartridge tube comprises at least one opening, arranged in a region where the cartridge tube is covered by one of said end caps, which opening allows the potting resin to penetrate through the cartridge tube into a hollow space between the cartridge tube and the end cap.

4. The cartridge element according to claim 1, wherein
the at least one end cap comprises a first cylindrical section with an inner diameter which is wider than an outer diameter of the cartridge tube and a second cylindrical section with an inner diameter smaller than that of the first cylindrical section, so that the second cylindrical section cannot be slid onto the cartridge tube; or
the end cap comprises a first cylindrical section with an outer diameter which is smaller than an inner diameter of the cartridge tube and a second cylindrical section with an outer diameter larger than that of the first cylindrical section, so that the second cylindrical section cannot be slid into the cartridge tube.

5. The cartridge element according to claim 1, wherein the at least one end cap comprises a cylindrical section which is slid onto the cartridge tube and an additional cylindrical section which is not slid over the cartridge tube and is slid over a part of the hollow fiber membrane bundle protruding from the cartridge tube.

6. The cartridge element according to claim 1, wherein the cartridge tube has at least one of the following properties:
the cartridge tube is made of a metal, preferably stainless steel or aluminum;
the cartridge tube has a wall thickness of 1 to 5 mm;
the cartridge tube has an inner diameter that is between 10 and 250 mm.

7. The cartridge element according to claim 1, wherein the potting resin is selected from the group consisting of epoxy resins and polyurethane resins, preferably of a resin having one, particular preferred at least one, most preferred all of the following properties:
A glass transition temperature >80° C.;
Flat sample bars (according to standard test ASTM D648-07) made from the potting resin have a flexural strength >70 MPa at room temperature;
Flat sample bars (according to standard test ASTM D648-07) made from the potting resin have a elongation at break >8%;
the potting resin starts curing at temperatures below 40° C.;
a fully cured potting made in a mould having an inner diameter of 110 mm and filled with approximately 500 grams of resin and optional fibers has a shrinkage below 0.5%;
the potting resin has a gel time of >1 hour;
the potting resin has a viscosity after mixing of resin and a hardener of <2000 mPas;
if the resin comprises a filler, the filler does not segregate upon centrifuging with 20 to 40G.

8. The cartridge element according to claim 1 wherein the end caps of said cartridge element according to claim 1 is/are made of a polymer or polymer blend, which is optionally filled with up to 30% by weight of glass fibers or other reinforcing materials and which polymer or polymer blend is selected from polyphenylene sulfide or a blend of polyphenylene oxide and polystyrene.

9. A membrane separation device comprising a cartridge element according to claim 1.

10. The membrane separation device according to claim 9, comprising in addition
a single or multi cartridge housing, and
O-rings arranged between each end cap of the cartridge element and the cartridge housing to separate feed and permeate atmospheres.

11. A process for manufacture of hollow fiber cartridge elements comprising the steps
a) providing a bundle of hollow fiber membranes and a cylindrical cartridge tube with at least one fluid inlet or fluid outlet opening
b) sliding the membrane bundle into the cartridge tube
c) mounting plastic end caps on both sides of the assembly of step b), partially sliding at least one end cap onto or into the cartridge tube; said end cap comprising a cylindrical section with an inner diameter which is wider than an outer diameter of the cartridge tube or a cylindrical section with an outer diameter which is narrower than an inner diameter of the cartridge tube, and said cylindrical section of the end cap comprising spacers that center the cap onto or into the cartridge tube and leave space between the cartridge tube and the cylindrical section of the end cap, d) placing the assembly obtained in step c) into a centrifuge in a manner that ensures that the assembly is held together e) filling a potting resin into both end caps and curing during centrifugation f) cutting off the end parts of both end caps to open the bores of the hollow fiber membranes.

12. The process according to claim 11, wherein it comprises at least one of the following additional steps placing a porous material, preferably a mesh; between the outer surface of the bundle of hollow fiber membranes and the inner surface of the cartridge tube;

closing off the ends of the fibers with wax or an epoxy or polyurethane resin before potting;

pre-treating at least those parts of the surface of the end cap that get into contact with the potting resin with a flame or chemically, preferably with an acid, or mechanically, preferably by sand blasting, to purify the surface and optionally to roughen it in order to improve its adhesion to the cartridge element;

pre-filling the end caps before centrifugation starts;

heating the cartridge before and during cutting off to a temperature above the glass transition temperature of the cured potting resin.

13. The process according to claim 11 wherein centrifugation is done at 200 to 350 rpm and at a temperature between 5 and 40° C.

14. The cartridge element according to claim 1 wherein the end caps of said cartridge element are made of a polymer or polymer blend or polymer mixture, which is optionally filled with up to 30% by weight of glass fibers or other reinforcing materials, said polymer or polymer blend or polymer mixture possessing one of the following properties:

it is injection mouldable;

its maximum thermal expansion coefficient is $1 \times 10^{-4}$ 1/K;

its heat deflection temperature up to which the material keeps it shape is at least 140° C.;

end caps made of the polymer or polymer blend or polymer mixture have a shrinkage of less than 1%.

* * * * *